United States Patent [19]

Kawamura et al.

[11] Patent Number: 5,663,775

[45] Date of Patent: Sep. 2, 1997

[54] VIDEO PROJECTOR WITH LUMINANCE AND CHROMINANCE OPTICAL MODULATION LCD'S

[75] Inventors: Hiroshi Kawamura, Nagaokakyo; Hisao Koizumi, Tokyo; Yoshisuke Ohtsuru, Kurume, all of Japan

[73] Assignee: Mitsubishi Denki Kabushiki Kaisha, Tokyo, Japan

[21] Appl. No.: 429,568

[22] Filed: Apr. 27, 1995

[30] Foreign Application Priority Data

Apr. 27, 1994 [JP] Japan .................... 6-089354

[51] Int. Cl.⁶ .................... H04N 5/74; H04N 9/31
[52] U.S. Cl. .................... 348/751; 348/750
[58] Field of Search .................... 348/744, 756, 348/766, 761, 751, 790, 760, 757, 196, 758, 779, 781, 764, 749, 791, 745, 753, 115, 755, 804; 359/40, 651, 49, 443, 41, 47, 448, 71, 714, 764; 353/30, 33, 28; H04N 5/74, 9/31

[56] References Cited

U.S. PATENT DOCUMENTS

| | | | |
|---|---|---|---|
| 4,833,528 | 5/1989 | Kobayashi | 348/196 |
| 4,868,668 | 9/1989 | Tavernetti | 348/745 |
| 5,153,752 | 10/1992 | Kuramatsu et al. | 359/40 |
| 5,237,399 | 8/1993 | Inada et al. | 348/761 |
| 5,325,473 | 6/1994 | Monroe et al. | 395/129 |
| 5,404,234 | 4/1995 | Taniguchi et al. | 348/744 |

FOREIGN PATENT DOCUMENTS

| | | |
|---|---|---|
| 02076485 | 3/1990 | Japan . |
| 02123344 | 5/1990 | Japan . |
| 04259177 | 9/1992 | Japan . |
| 04267246 | 9/1992 | Japan . |

Primary Examiner—Michael H. Lee

[57] ABSTRACT

In a video projector, first and second light sources respectively emit first and second collimated, white light beam, a luminance optical modulation means modulates the first light beam in accordance with a luminance signal of an input video signal, a chrominance optical modulation means modulates the second light beam in accordance with a chrominance signal of the input video signal, a first projecting means projects the first light beam having been modulated by the luminance optical modulation means onto a projection screen to form a projected luminance image on the screen, and a second projecting means projects the second light beam having been modulated by the chrominance optical modulation means onto the projection screen to form a projected chrominance image on the screen. The projected luminance image and the projected chrominance image are superimposed with each other on the screen to form a full color image.

21 Claims, 5 Drawing Sheets

FIG.3
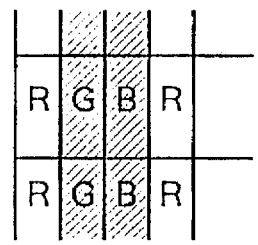
FIG.4
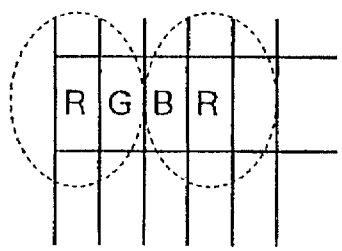
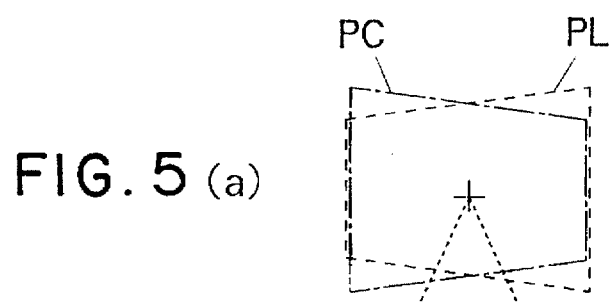
FIG. 5 (a)
FIG. 5 (b)　　　　　FIG. 5 (c)
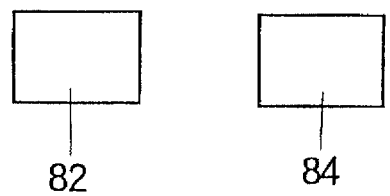

FIG. 6(a)
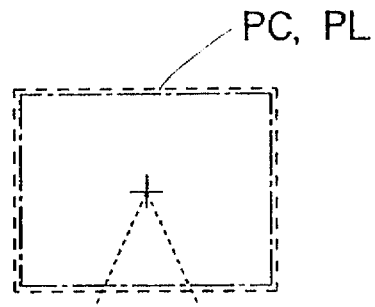
PC, PL
FIG. 6(b) 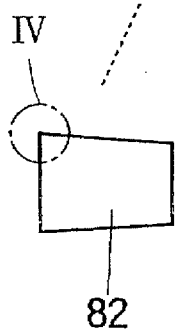 IV  V 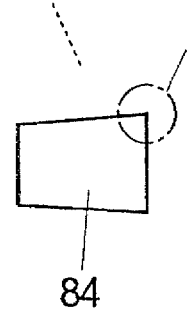 FIG. 6(c)
82  84
FIG. 6(d)
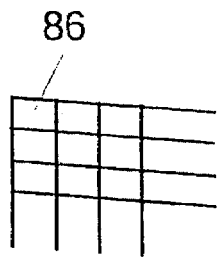
86
FIG. 6(e)
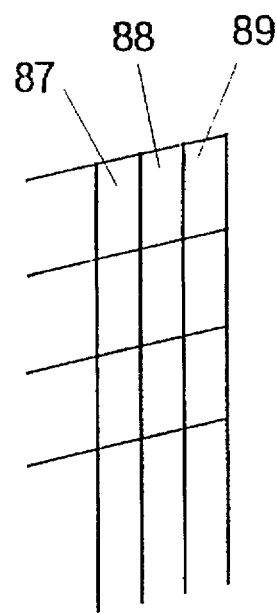
87  88  89

VIDEO PROJECTOR WITH LUMINANCE AND CHROMINANCE OPTICAL MODULATION LCD'S

BACKGROUND OF THE INVENTION

This invention relates to a video projector, also known as a projection television system, using optical modulation means.

The configuration of an optical system of a prior art liquid crystal projector is shown in FIG. 7, wherein three liquid crystal panels of the three primary colors—red (R), green (G), and blue (B)—are used as optical modulation means.

Referring to FIG. 7, the projector is provided with a light source 1 comprising a lamp 10 and a reflective mirror 11. A white-light lamp, such as a metal halide lamp, a xenon lamp, or a halogen lamp is used as the lamp 10. The reflective surface of the mirror 11 is basically parabolic, and the lamp 10 is so disposed that its luminiferous center is at the about the focal position of the parabolic surface. The reflective mirror 11 therefore serves as to collimate the light and the light source 1 therefore emits a substantially collimated beam 100 of white light.

A first dichroic mirror 21 reflects only the red component of white light from the lamp 10, while permitting passage of green and blue components of the light. A reflective mirror 24 reflects the red component of light from the dichroic mirror 21 and supplies it to a liquid crystal panel 30 for red. A second dichroic mirror 22 reflects only the green component of the light (consisting of green and blue components) that has passed through the first dichroic mirror 21 and supplies the green component to a liquid crystal panel 31 for green, while permitting passage of the blue component of light. Reflective mirrors 23 and 25 reflect the blue component of light and supplies it to a liquid crystal panel 32 for blue.

The red, green and blue components of light supplied to the liquid crystal panels 30, 31 and 32 are in the form of beams 100R, 100G and 100B, and are modulated by the liquid crystal panels to form red, green and blue monochromatic image beams. That is, the intensities of each part of the red, green, and blue beams 100R, 100G and 100B are varied by the respective pixels of the liquid crystal panels 30, 31, and 32 that display monochromatic images corresponding to respective color component signals, i.e., an R signal, a G signal, and a B signal, decoded from the video signal that are supplied to the liquid crystal panels 30, 31 and 32, and the liquid crystal panels emit the optically-modulated image beams of the respective colors.

A third dichroic mirror 40, formed of two dichroic mirror components assembled into a cross shape as illustrated, combines the image beams from the liquid crystal panels 30, 31 and 32 into a single beam of full Color (consisting of red, green and blue components). A projection lens 50 magnifies and projects the combined image beam onto a screen 60.

The above prior art liquid crystal projector is associated with the following problems.

A first problem is a relatively complicated optical system is required, the light sources need to emit white light of a relatively high power, and the spatial density of the liquid crystal panels must be high, in order to produce a satisfactory picture quality. The inventors have found that this is due to the fact that the prior art system does not utilize the characteristics of the human sense of sight which has a high resolution with respect to luminance but a lower resolution with respect to color.

Another problem is that it is necessary to accurately position the three liquid crystal panels for red, green, and blue for convergence for each pixel is necessary, in order to prevent color misregistration of the three primary colors. This means that a great deal of time is necessary for adjustment in the assembly process.

Another problem is that, since the third dichroic mirror serving as the image combining means combines the three modulated monochromatic beams is interposed between the liquid crystal panels and the projection lens, the distance between the liquid crystal panels and the projection lens is lone and thus the projection distance is increased. In other words, the projection screen size is increased, but the projected image is likely to be dim.

A further problem is that the red, green, and blue projected images must be registered for each pixel over the entire surface of the screen, requiring complete chromatic aberration compensation at the projection lens.

A further problem concerns a deterioration in the white balance at a center portion of the projected image caused by differences in length of the optical paths from the light source lamp 10 up to the image combining means, and, if this is compensated for, it is likely that this could then lead to deterioration of gray scale resolution in the projected image. This is described below. For example, if the dichroic mirrors 21 and 22 and the reflective mirror 23 are set at the same spacing, the lengths of the optical paths of the red beam 100R and green beam 100G up to the center portion of the third dichroic mirror 40 will be substantially the same, but the length of the optical path of the blue beam 100B up to the same center portion of the third dichroic mirror 40 is longer by the spacing between the first dichroic mirror 21 and the reflective mirror 23. Thus, the illuminance distribution on the liquid crystal panel for blue 32 will be different.

The reason is as follows. Because of the presence of factors such as the arc length of the lamp 10, the light beam emitted from the light source 1 is not completely collimated even if, for example, the collimating means 11 is used. A difference in the illuminance between the central and peripheral parts is greater with regard to the liquid crystal panel for blue supplied with the light beam traveling the longest optical path. This can be compensated for by application of white balance correction signals.

The white balance correction is achieved, by reducing the brightness of the liquid crystal panels which receive stronger light beams. As a result, application of the white balance correction will lowers the gray scale resolution of the picture produced by the projection.

SUMMARY OF THE INVENTION

The present invention was devised to solve the above described problems and its object is to provide a video projector that can realize a highly fine projected image, such as a highly fine projected full-color image, with a configuration that is compact and suited to the characteristics of the human sense of sight.

According to the invention, there is provided a projector comprising:
- a first light source for emitting a first light beam which is substantially collimated and substantially white;
- a second light source for emitting a second light beam which is substantially collimated and substantially white;
- a luminance optical modulation means for modulating the first light beam in accordance with a luminance signal of an input video signal;

a chrominance optical modulation means for modulating the second light beam in accordance with a chrominance signal of the input video signal;

a first projecting means for projecting the first light beam having been modulated by the luminance optical modulation means onto a projection screen to form a projected luminance image on the screen; and a second projecting means for projecting the second light beam having been modulated by the chrominance optical modulation means onto the projection screen to form a projected chrominance image on the screen;

the projected luminance image and the projected chrominance image being superimposed with each other on the screen to form a full color image.

With the above arrangement, a full color image can be formed by the use of two optical modulation means, and two light sources, so that the configuration of the optical system is simplified.

The projector may further comprise:

an arithmetic circuit for receiving a luminance signal Y and first, second and third chrominance component signals C1, C2 and C3, and producing a modified luminance signal Y1 and modified chrominance component signals C11, C12, and C13 in accordance with the following equations:

$$Y1=Y+\text{Min}[C1, C2, C3]$$

$$C11=C1-\text{Min}[C1, C2, C3]$$

$$C12=C2-\text{Min}[C1, C2, C3]$$

$$C13=C3-\text{Min}[C1, C2, C3]$$

where Min[C1, C2, C3] represents the minimum of C1, C2 and C3, and the luminance optical modulation means modifies the first light beam in accordance with the modified luminance signal Y1, and the chrominance optical modulation means modifies the second light beam in accordance with the modified chrominance signals C11, C12 and C13.

the use of the above equations, the muddiness in the projected image due to the brightness components in the chrominance component signals can be removed or reduced.

In the above equations, the first, second and third chrominance signals C1, C2 and C3 may be color difference signals (R-Y), (G-Y) and (B-Y), respectively, where R, G and B represent red, green and blue components of the chrominance signal.

With the above configuration, the projector can be used in combination with a system receiving and processing the standard video signal (such as NTSC and PAL signals) of the type from which color-difference signals are produced by a standard circuitry.

The chrominance optical modulation means may comprise a color liquid crystal panel comprising a liquid crystal panel and a color filter, and the projector may further comprise:

an arithmetic circuit for receiving a luminance signal Y and first, second and third chrominance component signals C1, C2 and C3, and producing a modified luminance signal Y1 and modified chrominance component signals C11, C12, and C13 in accordance with the following equations:

$$Y1=Y+(1+k)\text{Min}[C1, C2, C3]$$

$$C11=C1-(1+k)\text{Min}[C1, C2, C3]$$

$$C12=C2-(1+k)\text{Min}[C1, C2, C3]$$

$$C13=C3-(1+k)\text{Min}[C1, C2, C3]$$

where Min[C1, C2, C3] represents the minimum of C1, C2 and C3, and k represents a factor corresponding to the black component associated with the color filter:

the luminance optical modulation means modifies the first light beam in accordance with the modified luminance signal Y1, and the chrominance optical modulation means modifies the second light beam in accordance with the modified chrominance signals C11, C12 and C13.

By the use of the above equations, the muddiness in the projected image due to the brightness components in the chrominance component signals can be removed or reduced, and the effect of black component of the color filters are also eliminated or reduced.

In the above equations, the first, second and third chrominance signals C1, C2 and C3 are color difference signals (R-Y), (G-Y) and (B-Y), respectively, where R, G and B represent red, green and blue components of the chrominance signal.

With the above configuration, the projector can be used in combination with a system receiving and processing the standard video signal (such as NTSC and PAL signals) of the type from which color-difference signals are produced by a standard circuitry.

It may be so arranged that vertical spatial frequency of pixels of the chrominance optical modulation means is less than the vertical spatial frequency of pixels of said luminance optical modulation means. The term "vertical" in connection with the modulation means as used in this application means the direction which corresponds to the vertical direction on the projection screen.

With the above arrangement, the configuration of the chrominance optical modulation means is less complicated, and yet a satisfactory picture can be obtained. This is because the human sense of sight has a high resolution with respect to luminance but a low resolution with respect to color. If the vertical spatial frequency of the pixels is lowered, the vertical definition is lowered, but reduction in the vertical definition is less objectionable to human eyes than reduction in the horizontal spatial direction.

The second projection means may be so set that the projected chrominance image is offset from the best focus state.

In other words, the projected chrominance image is intentionally defocused. As a result, appearance of unsightly black portions can be prevented. Moreover, Moire due to interference between fine patterns in the projected chrominance image and the regular arrangement of the pixels of the chrominance modulation means can be eliminated or reduced.

The first projection means may be so set that the projected luminance image is offset from the best focus state.

In other words, the projected luminance image is intentionally defocused. As a result, Moire due to interference between fine patterns in the projected luminance image and the regular arrangement of the pixels of the luminance modulation means can be eliminated or reduced.

At least one of the first and second projection means is disposed so that the optical axis of the image beam projected from said at least one of the first and second projection means onto the screen is inclined with respect to the normal to the screen, and one of the luminance and chrominance optical modulation means corresponding to the one of the first and second projection means has pixels which are trapezoidal to compensate for trapezoidal distortion of the projected image.

With the above arrangement, the effect of the trapezoidal distortion can be eliminated or reduced.

BRIEF DESCRIPTION OF THE DRAWINGS

In the Accompanying drawings:

FIG. 3 is a diagram showing the projected chrominance image corresponding pixels of the respective colors, one of which is driven by a saturated signal, and the projected image is just focused;

FIG. 4 is a diagram showing the projected chrominance image corresponding pixels of the respective colors, one of which is driven by a saturated signal, and the projected image is defocused;

FIG. 5(a), FIG. 5(b) and FIG. 5(c) are schematic diagrams showing how the trapezoidal distortion occurs with respect to the luminance liquid and chrominance liquid crystal panels;

FIG. 6(a), FIG. 6(b) and FIG. 6(c), FIG. 6(d) and FIG. 6(e) are schematic diagrams showing trapezoidal liquid crystal panels formed of trapezoidal pixels for compensating for the trapezoidal distortion;

DETAILED DESCRIPTION OF THE PREFERRED EMBODIMENTS

In all of the embodiments described below, the description concerns examples that use liquid crystal panels as luminance optical modulation means and chrominance optical modulation means.

First Embodiment

Figure 1:
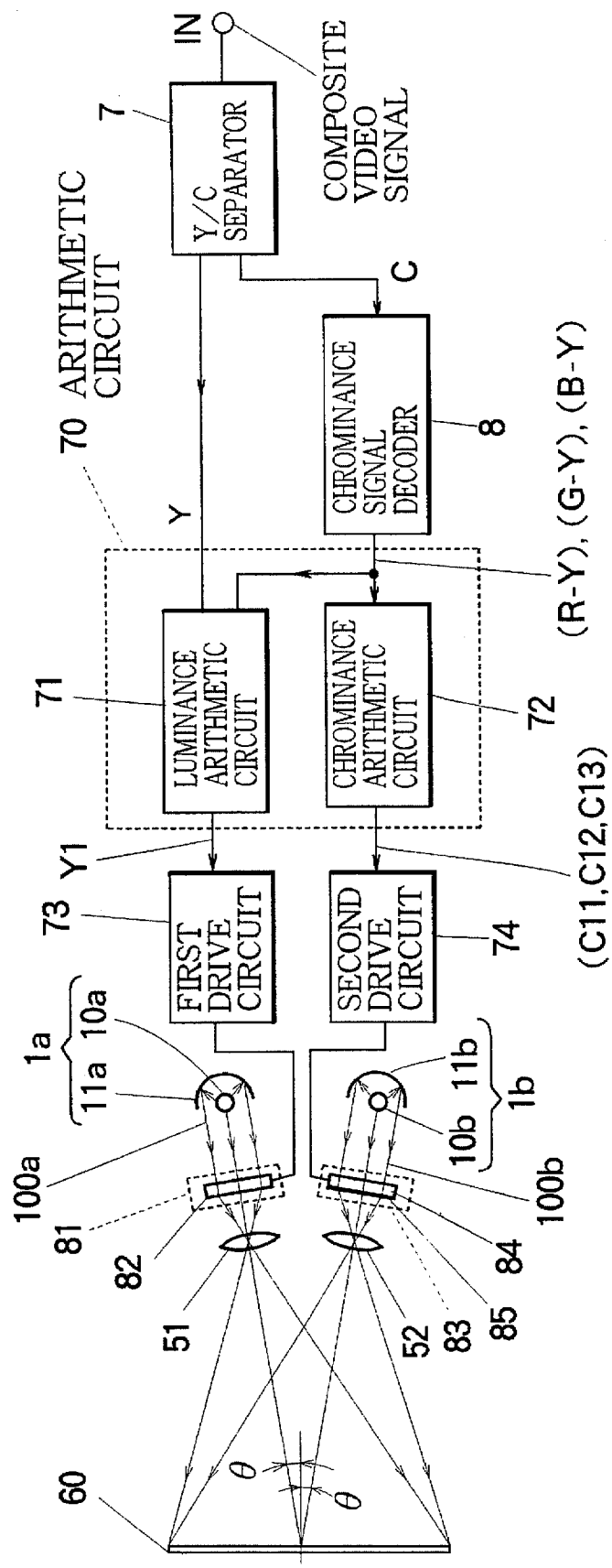
FIG. 1 is a structural diagram of the projector of an embodiment of the invention.

The configuration of a liquid crystal projector of a first embodiment of the present invention is shown in FIG. 1.

Figure 7:
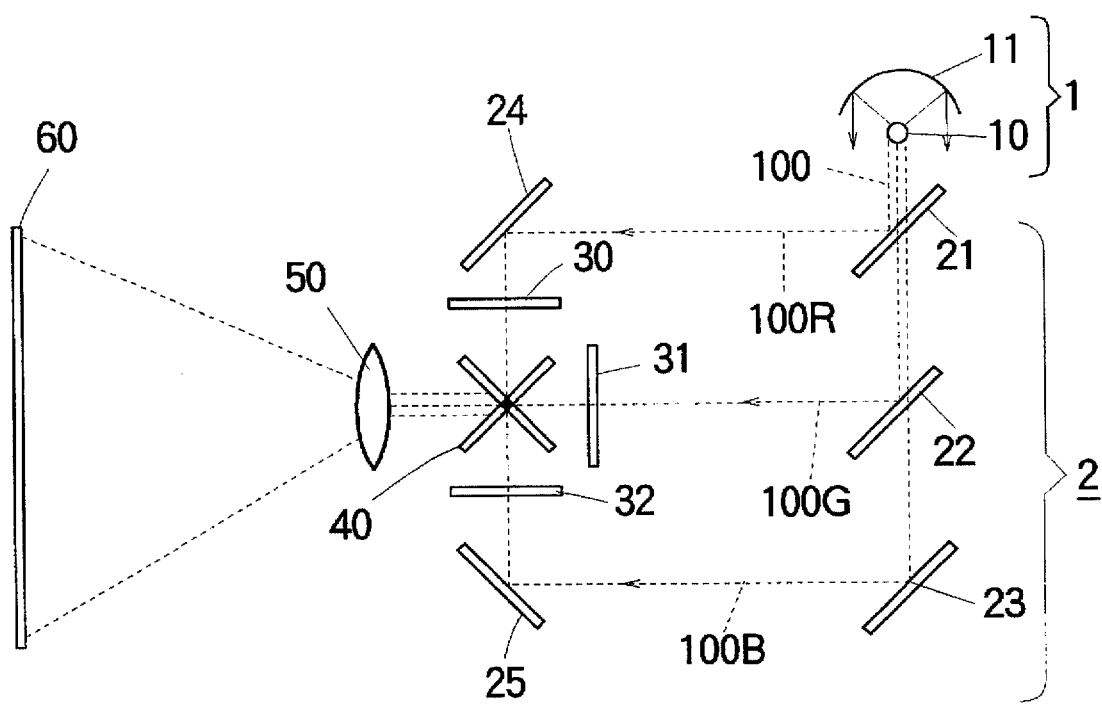
FIG. 7 is a diagram of the configuration of a prior art video projector using three liquid crystal panels.

As illustrated, the video projector of this embodiment comprises a first light source 1a comprising a lamp 10a and a collimator 11a, and a second light source 1b comprising a lamp 10b and a collimator 11b. The light sources 1a and 1b are each similar to the light source 1 in the prior art of FIG. 7, the lamps 10a and 10b are each similar to the lamp 10 in the prior art of FIG. 7, and the collimator 11a and 11b each similar to the collimator 11 in the prior art of FIG. 7.

The collimated light 100a from the light source 1a is passed through a luminance optical modulator 81 comprising a liquid crystal panel 82 driven by a luminance signal supplied from a first drive circuit 3, to be described later. The collimated light 100b from the light source 1b is passed through a chrominance optical modulator means 83 in the form of a color liquid crystal panel comprising a liquid crystal panel 84 and a color filter 85. The liquid crystal panel 84 is driven by a second drive circuit 74 to be described later, and first, second and third sets of pixels respectively driven by first, second and third chrominance component signals, e.g. (R-Y), (G-Y) and (B-Y). The first, second and third sets of pixels are arranged in a mosaic pattern. The color filter 85 comprises first, second and third filter components having portions in alignment with the pixels of the corresponding colors, in the liquid crystal panel 84.

The light beam having passed the luminance optical modulator 81 is optically modulated according to the image displayed on the liquid crystal panel 82, and is magnified by a projection lens 51, and projected onto the screen 60. The light beam having passed the chrominance optical modulator 83 is optically modulated according to the image displayed on the liquid crystal panel 84, and is magnified by a projection lens 52, and projected onto the screen 60. The image light beams from the lenses 51 and 52 are superimposed, combined or additively mixed with each other, to form a full color image on the screen 60.

The circuit used for driving the liquid crystal panels 82 and 84 will next be described.

A composite video signal of the NTSC video signal system, comprising a luminance signal, a chrominance signal, and a synchronization signal, is input as an input video signal to an input terminal IN.

This input composite video signal is input to a Y/C separator circuit 7 and is separated into the luminance signal Y and chrominance signal C according to the NTSC system. The chrominance signal C is supplied to a chrominance signal decoder 8, and three color-difference signals (R-Y), (G-Y) and (B-Y), are output from this chrominance signal decoder 8. These color-difference signals (R-Y), (G-Y), and (B-Y) output from the chrominance signal decoder 8 and the luminance signal Y from the Y/C separator circuit 7 are supplied to an arithmetic circuit 70 comprising a luminance arithmetic circuit 71 and a chrominance arithmetic circuit 72. Specifically, the color-difference signals (R-Y), (G-Y), and (B-Y) output from the chrominance signal decoder 8 and the luminance signal Y from the Y/C separator circuit 7 are supplied to the luminance arithmetic circuit 71 where an arithmetic processing expressed by the following Equation (1) is performed to form a modified luminance signal Y1.

$$Y1=Y+\text{Min}\{(R-Y), (G-Y), (B-Y)\} \qquad (1)$$

where $\text{Min}\{(R-Y), (G-Y), (B-Y)\}$ is a minimum of (R-Y), (G-Y), and (B-Y). This minimum corresponds to the darkness or brightness of the color signal formed of the color component signals.

The modified luminance signal Y1 is output to the first drive circuit 73 to drive the liquid crystal panel 82 of the luminance optical modulator means 81.

The output signals of the chrominance signal decoder 8 are supplied to the chrominance arithmetic circuit 72 where an arithmetic processing expressed by the following Equations (2) is performed to form three modified chrominance signals C11, C12, and C13. The modified chrominance signals are output to the second drive circuit 74 to drive the chrominance liquid crystal panel 84.

$$C11=(R-Y)-\text{Min}\{(R-Y), (G-Y), (B-Y)\}$$
$$C12=(R-Y)-\text{Min}\{(R-Y), (G-Y), (B-Y)\}$$
$$C13=(R-Y)-\text{Min}\{(R-Y), (G-Y), (B-Y)\} \qquad (2)$$

In place of the color-difference signals (R-Y), (G-Y) and (B-Y) in the Equations (1) and (2), any other chrominance component signals may be used to determine the modified luminance signal Y1 and the modified chrominance component signals C11, C12, and C13.

As described above, the light emitted by the collimating means 11a is subjected to optical modulation in accordance with a brightness image displayed on the luminance liquid crystal panel 82 responsive to the luminance signal Y1, and a magnified brightness image is projected onto the screen 60 through the projection lens 51.

The light emitted by the collimator 11b is subjected to optical modulation in accordance with the chrominance signals C11, C12, and C13 by means of the liquid crystal panel 84 and passed through the color filter 85 having red, green, and blue color filter components arranged in a mosaic pattern as shown in FIG. 2(a), FIG. 2(b), FIG. 2(c) and FIG. 2(d). The image light beam is magnified by the lens 52, and projected onto the screen 60. The image light beams from the lenses 51 and 52 are combined on the screen 60 to form a full-color image.

The projection lenses 51 and 52 are held so that the optical axis of the image light beams projected onto the screen 60 are at a predetermined inclination angle θ. The inclination angle may be identical to each other as illustrated, and the optical paths from the respective light sources to the screen can be made identical each other. Chrominance components due to the projected image beams from the chrominance optical modulator 83 are superimposed on the display image of the luminance component (which is herein called a luminance image). As a result, a projected image obtained by combining luminance component and chrominance components can be reproduced on the screen 60.

Only two optical paths in the projection means are required, and the lengths of both optical paths up to the screen 60 are the same. This is in contrast to the prior art system shown in FIG. 7, where three optical paths are provided, and the length of the optical path for The blue beam 100B up to the third dichroic mirror 40, and hence to the screen 60 is longer than the optical paths for the red and green beams 100R and 100G.

A brightness component k due to the black component present in the red, green, and blue color filter components of the color filter 85 of the chrominance optical modulation means 83 could also be taken account of. In such a case, the above minimum signal is multiplied by a factor of (1+k) to give a modified minimum signal. Note that the value of k is such that: $0 \leq k \ll 1$, and is determined by experiment and experiences. It is clear that consideration of this black component of the color filter components of the color filter 85 will also affect the luminance signal Y1 and the chrominance signals C11, C12, and C13.

Second Embodiment

Figure 2:
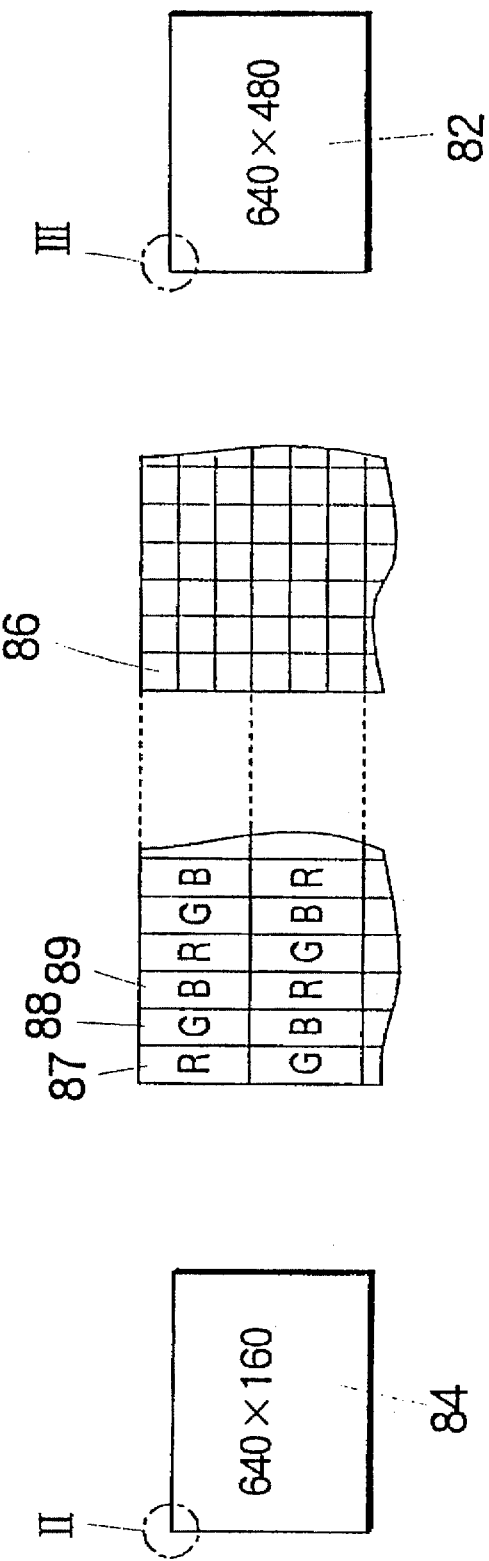
FIG. 2(a), FIG. 2(b), FIG. 2(c) and FIG. 2(d) are diagrams showing an example of the configurations of the pixels of the luminance liquid crystal panel and the chrominance liquid crystal panel of the projector of the embodiment of FIG. 1.

An example of the pixel structure and arrangement of a luminance liquid crystal panel 82 of the luminance optical modulator 81 and a chrominance liquid crystal panel 84 of the chrominance optical modulator 83 in accordance with a second embodiment of the present invention is shown in FIGS. 2(a)–2(d) in which schematic enlarged views of parts (II and III at FIG. 2(a) and FIG. 2(d) are illustrated at FIG. 2(b) and FIG. 2 (c).

This second embodiment is an example of a specific application of a characteristic of the human sense of sight by which resolution with respect to luminance (brightness) is high but resolution with respect to color is low, not only to the signal frequency bandwidth, but also to the size of a pixel of a liquid crystal panel that modulates the white light Referring to FIG. 2(b), the vertical size of pixels 87 to 89 in the chrominance liquid crystal panel 84 is three times the vertical size of pixels 86 (at in FIG. 2(c)) in the luminance liquid crystal panel 82, the number of the pixels in the chrominance liquid crystal panel 84 is 640 in the horizontal direction by 160 in the vertical direction as shown at in FIG. 2(a), while the number of the pixels in the luminance liquid crystal panel 82 is 640 in the horizontal direction by 480 in the vertical direction as shown in FIG. 2(d), and the vertical spatial frequency of the pixels in the chrominance liquid crystal panel 84 is one third the vertical spatial frequency of the pixels in the luminance liquid crystal panel 82.

This arrangement is advantageous in that it is possible to produce a satisfactory color picture using a liquid crystal panel for chrominance modulation which is of a lower definition and hence of a simpler configuration and of a less cost. Another advantage is that the balance between the chrominance image and the luminance image can be improved. This is because the aperture ratio for each pixel of the chrominance liquid crystal panel (= the proportion of the effective pixel area with respect to the entire area for each pixel) is approximately three times. The reason for this is described below.

In the region for each pixel of the liquid crystal panel, part of the liquid crystal which are covered by the pixel electrode is controlled, and other part is not controlled. In order to prevent leakage of light from these portions that are not controlled, these portions are usually shielded by a black matrix provided at the opposite electrode. If the width of stripe portions of the black matrix, corresponding to the separations between adjacent electrodes, is constant, the proportion of the effective display area (=the total area of the pixel minus the area of the shielded portion) with respect to the total area of the pixel, in other words the aperture ratio, increases as the total area of the pixel increases. Because the vertical size of each pixel of the chrominance liquid crystal panel 84 is larger than the vertical size of each pixel of the luminance liquid crystal panel 82, as described above, the aperture ratio of the chrominance liquid crystal panel 84 is larger. If the area of this shielded portion per pixel is the same between the luminance liquid crystal panel 82 and the chrominance liquid crystal panel 84, the aperture ratio of the chrominance liquid crystal panel 84 is about three times the aperture ratio of the luminance liquid crystal panel 82.

This increase in the aperture ratio of the chrominance liquid crystal panel 84 is significant. That is, the intensity of the light from the chrominance optical modulator 83 is slightly lower than the intensity of the light from the luminance optical modulator 81 because of the absorption of light by the color filter, i.e., the black component of the filter. By making the aperture ratio of the chrominance liquid crystal panel 84 about three times the aperture ratio of the luminance liquid crystal panel 82, the intensity of the color image from the chrominance liquid crystal panel 84 is increased, and approaches the intensity of the luminance image from the luminance liquid crystal panel 82, which has the important effect of improving the balance of intensity. In other words, the brightness and the gray scale resolution of the projected image are improved.

In the embodiment described, above, the vertical size of the pixels in the chrominance liquid crystal panel 84 is three times the vertical size of the pixels in the luminance liquid crystal panel 82, and the vertical spatial frequency of the pixels in the chrominance liquid crystal panel 84 is one third the vertical spatial frequency of the pixels in the luminance liquid crystal panel 82. The invention is however not limited to the specific ratios of the size and the vertical spatial frequency. If the vertical size of the pixels in the chrominance liquid crystal panel 84 is larger than the vertical size of the pixels in the luminance liquid crystal panel 82, and the vertical spatial frequency of the pixels in the chrominance liquid crystal panel 84 is lower than the vertical spatial frequency of the pixels in the luminance liquid crystal panel 82, similar effects are obtained.

The term "vertical" in connection with the liquid crystal panel or the optical modulation means as used in this application means the direction which optically corresponds to the vertical direction on the projection screen. If the vertical spatial frequency of the pixels is lowered, the vertical definition is lowered, but reduction in the vertical definition is less objectionable to human eyes as compared with reduction in the horizontal spatial direction.

Third Embodiment

A third embodiment of the invention is described with reference to FIG. 3 and FIG. 4. In this embodiment, the projection lens 52 is so set that the chrominance image projected on the screen 80 is slightly offset from the best focus state, while the projected luminance image is in the best focus state. Here, the term "best focus state" is used to refer to the state in which the image is Just focused or nearly focused, with minimum deviation from the Just focus on the whole. For instance, the image may be Just focused in the central part of the screen, and defocused in the peripheral parts of the screen. This is unavoidable because of the difference in the distance from the center of the lens and the respective parts of the screen. In such a situation, the "best focus state" may mean Just focus in the central part, combined with the minimum deviation from the just focus in the peripheral parts of the screen.

According to the third embodiment, the chrominance image is offset from such best focus state. In other words, slight defocusing is intentionally introduced. The slight defocus is equivalent to a phenomenon called blooming in a CRT provided with an electron gun which results when the beam current is slightly too large and a scanning spot on the fluorescent screen is a little fat, making the image slightly blurred.

The description now turns to why the above defocusing is desirable. FIG. 3 shows part of the chrominance image projected on the screen 60 on which a pixels are projected, where the projection lens 52 is set to achieve the correct focus, and the second drive circuit 74 is used to drive the chrominance liquid crystal panel 84 with a 100% red saturated signal, and the emitted light that has been optically modulated thereby is projected onto the screen 60. This figure shows that if, for example, the chrominance signal is 100% saturated with red, no light is passed through the green and blue pixels (hatched parts G and B in FIG. 3) between the red pixels (unhatched parts R in FIG. 3), so that the brightness of the corresponding part in the projected image is lower than the adjacent parts corresponding to the saturated red pixels.

This is unsightly because the human eyes are sensitive to brightness. If the image is defocused according to the embodiment of the invention, the parts corresponding to the red (R) pixels of the image projected on the screen 60 will be expanded to cover the parts corresponding to the green (G) and blue (B) pixels adjacent the red (R) pixels, as shown by the broken lines in FIG.4. As a result, the brightness of the parts corresponding to the green and blue pixels are increased, and the unsightliness of the projected image is reduced.

It should be clear that such black portions could also occur when a chrominance signal is saturated with green or blue, and the elimination or reduction of the black portions on the projected image also solves the problems of unsightliness due to the green or blue saturation.

It should also be noted that because the projected luminance image is focused to the best degree, the resolution is not perceived as degraded despite the defocusing of the projected chrominance image. This is again due to the fact that the human eyes are more sensitive to resolution in the luminance, and the decrease in the definition in the projected chrominance image is not objectionable.

Another effect of this third embodiment is the reduction in Moire. Moire is generated by interference between fine patterns, such as fine grid or stripe patterns, in the image formed from the input video signal, and the regular arrangement of the pixels of the liquid crystal panels. To a viewer sensitive to the quality of the picture, Moire is unsightly.

Moire is more conspicuous if the brightness or color of the displayed patterns vary more sharply. Because of the defocusing of the projected chrominance image, and because each pixel is effectively enlarged on the screen in accordance with this embodiment, Moire is less conspicuous.

In the embodiment described above, the projected luminance image is in the best focus state to maximize the resolution of the luminance image. In an alternative arrangement, the projected luminance image is offset from the best focus state. With such an arrangement, Moire due to the interference between the pattern of a regular fine pitch in the luminance image displayed on the luminance liquid crystal panel 82 and the regular arrangement of the pixels of the luminance liquid crystal panel 82 is reduced.

Fourth Embodiment

A fourth embodiment of the invention will next be described with reference to FIGS. 5(a)–5(c) and FIGS. 6(a)–(c) in FIGS. 6(a)–(e) schematic enlarged views of part IV and V at FIG. 6(b) and FIG. 6(c) are shown at FIG. 6(d) and FIG. 6(e). The fourth embodiment relates to use of a trapezoidal liquid crystal panels with trapezoidal pixels to compensate for trapezoidal distortion in the projected image because of the inclination angle of the optical axis of the image beams from the luminance and chrominance liquid crystal panels.

The reason why trapezoidal distortion occurs is first described with reference to FIG. 1 and FIGS. 5(a)–(c). Assume that, for example, rectangular liquid crystal panels 82 and 84 are rectangular as shown in FIGS. 5(b)–(c), and are arranged so their surfaces are perpendicular to respective light beams from the corresponding collimator 11a and 11b, and the light beams are made to pass through the projection lenses 51 and 52 and projected onto the screen 60 at a predetermined inclination angle θ.

There is a difference in length of the optical paths from the center of each of the projection lenses 51 and 52 up to the left and right sides of the surface of the screen 60, as shown in FIG. 1. The difference causes trapezoidal distortion in which the outer profile of the display panel is trapezoidal, and a rectangular pattern of the image displayed on the display panel is also trapezoidal in the image projected on the screen 60. Because the luminance and chrominance image beams are inclined in opposite directions, the trapezoidal distortions of the luminance and chrominance images PL and PC are toward the opposite directions, as shown, being exaggerated, in FIG. 5(a).

According to this embodiment, the liquid crystal panels 82 and 84 have outer profiles or frames formed of trapezoids as shown in FIGS. 6(b) and (c), and the pixels 86 to 89, are also trapezoidal as illustrated in an enlarged scale in in FIGS. 6(d) and (e). The orientations of the trapezoids forming the profiles of the panels 82 and 84 are opposite to each other, and the orientations of the trapezoids forming the pixels 86 and the pixels 87 to 89 are also opposite to each other, as also shown in FIG. 6(b) to (e). By the use of the trapezoidal panels with trapezoidal pixels, the trapezoidal distortion is compensated for. That is, the profiles of the panels 82 and 84 will be rectangular as indicated in FIG. 6(a) by a chain line PL, PC, which represents both of the projected images of the profiles of the two panels 82 and 84.

It is to be noted, that for the sake of simplicity of description, it is assumed that there is no inversion of the images between the incident side and the output side of the projection lens 51 or 52. If there is inversion of the images, the orientation of the trapezoids of the panels 82 and 84 and their pixels will naturally be reversed.

In the embodiment described, the inclination angles of the luminance and chrominance image beams are equal to each other, but the inclination angles may be different from each other. In such a case, the shape of the trapezoids forming the profiles of the panels 82 and 84 and pixels 86 and 87 to 89 should also be different. Still alternatively, one of the luminance and chrominance image beams may be incident such that its optical axis is perpendicular to the surface of the screen 60. In such a case, the liquid crystal panel emitting said one of the image beams may have a rectangular profile and rectangular pixels.

What is claimed is:

1. A projector comprising:

a first light source for emitting a first light beam which is substantially collimated and substantially white;

a second light source for emitting a second light beam which is substantially collimated and substantially white;

an arithmetic circuit receiving a luminance signal and a chrominance signal of an input signal and producing a modified luminance signal and a modified chrominance signal;

luminance optical modulation means for modulating the first light beam in accordance with the modified luminance signal;

chrominance optical modulation means for modulating the second light beam in accordance with the modified chrominance signal;

first projecting means for projecting the first light beam having been modulated by the luminance optical modulation means onto a projection screen to form a projected luminance image on the screen; and second projecting means for projecting the second light beam having been modulated by the chrominance optical modulation means onto the projection screen to form a projected chrominance image on the screen;

said projected luminance image and said projected chrominance image being superimposed with each other on the screen to form a full color image.

2. The projector according to claim 1, wherein the arithmetic circuit receives the luminance signal Y and first, second and third chrominance component signal C1, C2, and C3 of the chrominance signal produces the modified luminance signal Y1 and modified chrominance component signals, C11, C12, and C13 in accordance with the following equations:

$$Y1 = Y + \text{Min}[C1, C2, C3]$$

$$C11 = C1 - \text{Min}[C1, C2, C3]$$

$$C12 = C2 - \text{Min}[C1, C2, C3]$$

$$C13 = C3 - \text{Min}[C1, C2, C3]$$

where Min [C1, C2, C3] represents the minimum of first, second and third chrominance component signals of said chrominance signal C1, C2 and C3.

3. The projector according to claim 2, wherein the first, second and third chrominance signals C1, C2 and C3 are color difference signals (R-Y), (G-Y) and (B-Y), respectively, where R, G and B represent red, green and blue components of the chrominance signal.

4. The projector according to claim 1, wherein the luminance optical modulation means comprises a liquid crystal panel.

5. The projector according to claim 1, wherein the chrominance optical modulation means comprises a color liquid crystal panel comprising a liquid crystal panel and a color filter.

6. The projector according to claim 5, wherein the arithmetic circuit receives the luminance signal Y and first, second and third chrominance component signal C1, C2, and C3 of the chrominance signal produces the modified luminance signal Y1 and modified chrominance component signals, C11, C12, and C13 in accordance with the following equations:

$$Y1 = Y + (1+k)\text{Min}[C1, C2, C3]$$

$$C11 = C1 - (1+k)\text{Min}[C1, C2, C3]$$

$$C12 = C2 - (1+k)\text{Min}[C1, C2, C3]$$

$$C13 = C3 - (1+k)\text{Min}[C1, C2, C3]$$

where Min [C1, C2, C3] represents the minimum of C1, C2 and C3, and k represents a factor corresponding to the black component associated with the color filter.

7. The projector according to claim 6, wherein the first, second and third chrominance signals C1, C2 and C3 are color difference signals (R-Y), (G-Y) and (B-Y), respectively, where R, G and B represent red, green and blue components of the chrominance signal.

8. The projector according to claim 1, wherein the vertical spatial frequency of pixels of the chrominance optical modulation means is less than the vertical spatial frequency of pixels of said luminance optical modulation means.

9. The projector according to claim 8, wherein the vertical spatial frequency of pixels of the chrominance optical modulation means is one third the vertical spatial frequency of pixels of said luminance optical modulation means.

10. The projector according to claim 9, wherein the vertical size of the pixels of the chrominance optical modulation means is three times the vertical size of the pixels of said luminance optical modulation means.

11. A projector comprising:

a first light source for emitting a first light beam which is substantially collimated and substantially white;

a second light source for emitting a second light beam which is substantially collimated and substantially white;

luminance optical modulation means for modulating the first light beam in accordance with a luminance signal of an input video signal;

chrominance optical modulation means for modulating the second light beam in accordance with a chrominance signal of the input video signal;

first projection means for projecting the first light beam having been modulated by the luminance optical modulation means onto a projection screen to form a projected luminance image on the screen; and second projection means for projecting the second light beam having been modulated by the chrominance optical modulation means onto the projection screen to form a projected chrominance image on the screen; screen, wherein the first projection means is so set that the projected luminance image is offset from the best focus state;

said projected luminance image and said projected chrominance image being superimposed with each other on the screen to form a full color image.

12. A projector comprising:

a first light source for emitting a first light beam which is substantially collimated and substantially white;

a second light source for emitting a second light beam which is substantially collimated and substantially white;

luminance optical modulation means for modulating the first light beam in accordance with a luminance signal of an input video signal;

chrominance optical modulation means for modulating the second light beam in accordance with a chrominance signal of the input video signal;

first projection means for projecting the first light beam having been modulated by the luminance optical modulation means onto a projection screen to form a projected luminance image on the screen, wherein the first projection means is so set that the projected luminance image is offset from the best focus state; and second projection means for projecting the second light beam having been modulated by the chrominance optical modulation means onto the projection screen to form a projected chrominance image on the screen;

said projected luminance image and said projected chrominance image being superimposed with each other on the screen to form a full color image.

13. A projector comprising:

a first light source for emitting a first light beam which is substantially collimated and substantially white;

a second light source for emitting a second light beam which is substantially collimated and substantially white;

luminance optical modulation means for modulating the first light beam in accordance with a luminance signal of an input video signal;

chrominance optical modulation means for modulating the second light beam in accordance with a chrominance signal of the input video signal;

first projection means for projecting the first light beam having been modulated by the luminance optical modulation means onto a projection screen to form a projected luminance image on the screen; and second projection means for projecting the second light beam having been modulated by the chrominance optical modulation means onto the projection screen to form a projected chrominance image on the screen;

said projected luminance image and said projected chrominance image being superimposed with each other on the screen to form a full color image, wherein at least one of the first and second projection means is disposed so that the optical axis of the image beam projected from said at least one of the first and second projection means onto the screen is inclined with respect to the normal to the screen, and one of the luminance and chrominance optical modulation means corresponding to said one of the first and second projection means has pixels which are trapezoidal to compensate for trapezoidal distortion of the projected image.

14. A projector comprising:

a first light source for emitting a first light beam which is substantially collimated and substantially white;

a second light source for emitting a second light beam which is substantially collimated and substantially white;

an arithmetic circuit receiving a luminance signal and a chrominance signal of an input signal which modifies said luminance signal and said chrominance signal with a chrominance component signal of said chrominance signal and outputs a modified luminance signal and a modified chrominance signal;

luminance optical modulation means for modulating the first light beam in accordance with the modified luminance signal;

chrominance optical modulation means for modulating the second light beam in accordance with the modified chrominance signal;

first projecting means for projecting the first light beam having been modulated by the luminance optical modulation means onto a projection screen to form a projected luminance image on the screen; and second projecting means for projecting the first light beam having been modulated by the chrominance optical modulation means onto the projection screen to form a projected chrominance image on the screen;

said projected luminance image and said projected chrominance image being superimposed with each other on the screen to form a full color image.

15. A method for projecting an input video signal onto a screen comprising the steps of:

emitting a first and second substantially collimated, substantially white light beam;

modifying a luminance signal of said input video signal with a chrominance component signal of a chrominance signal of said input video signal;

modifying said chrominance signal with the chrominance component signal of said chrominance signal;

luminance modulating said first light beam in accordance with a modified luminance signal;

chrominance modulating said second light beam in accordance with a modified chrominance signal; and superimposing said luminance modulated first light beam and said chrominance modulated second light beam onto a projection screen to form a full color image.

16. A method for projecting an input video signal onto a screen comprising the steps of:

emitting a first and second substantially collimated, substantially white light beam;

modifying a luminance signal of the input video signal, where:

$$Y1=Y+\text{Min}[C1, C2, C3]$$

where Min [C1, C2, C3] represents the minimum of first, second and third chrominance component signals of a chrominance signal of the input video signal, C1, C2 and C3, respectively, and Y represents said luminance signal;

luminance modulating said first light beam in accordance with a modified luminance signal;

chrominance modulating said second light beam in accordance with chrominance signal of said input video signal; and superimposing said luminance modulated first light beam and said chrominance modulated second light beam onto a projection screen to form a full color image.

17. A method for projecting an input video signal onto a screen comprising the steps of:

emitting a first and second substantially collimated, substantially white light beam;

luminance modulating said first light beam in accordance with a luminance signal of said input video signal;

modifying chrominance component signals C1, C2 and C3 of a chrominance signal of said input video signal where;

$$C11 = C1 - Min[C1, C2, C3]$$

$$C12 = C2 - Min[C1, C2, C3]$$

$$C13 = C3 - Min[C1, C2, C3]$$

wherein Min [C1, C2, C3] represents the minimum of first, second and third chrominance component signals, C1, C2, and C3, respectively;

chrominance modulating said second light beam in accordance with modified chrominance component signals; and superimposing said luminance modulated first light beam and said chrominance modulated second light beam onto a projection screen to form a full color image.

18. The method according to claim 15, wherein said chrominance optical modulating comprises color filtering said second light beam with a color filter.

19. A method for projecting an input video signal onto a screen comprising the steps of:

emitting a first and second substantially collimated, substantially white light beam;

color filtering the second light beam with a color filter;

modifying a luminance signal of the input video signal, where:

$$Y1 = Y + (1+k)Min[C1, C2, C3]$$

where Min [C1, C2, C3] represents the minimum of first, second and third chrominance component signals of a chrominance signal of the input video signal, C1, C2 and C3, respectively, Y represents said luminance signal, and k represents a factor corresponding to a black component of said color filter;

luminance modulating said first light beam in accordance with a modified luminance signal;

chrominance modulating said second light beam in accordance with the chrominance signal of said input video signal; and superimposing said luminance modulated first light beam and said chrominance modulated second light beam onto a projection screen to form a full color image.

20. A method for projecting an input video signal onto a screen comprising the steps of:

emitting a first and second substantially collimated, substantially white light beam;

color filtering said second light beam with a color filter;

luminance modulating said first light beam in accordance with a luminance signal of said input video signal;

modifying chrominance component signals C1, C2 and C3 of a chrominance signal of said input video signal, where;

$$C11 = C1 - (1+k)Min[C1, C2, C3]$$

$$C12 = C2 - (1+k)Min[C1, C2, C3]$$

$$C13 = C3 - (1+k)Min[C1, C2, C3]$$

wherein Min [C1, C2, C3] represents the minimum of first, second and third chrominance component signals, C1, C2, and C3, respectively, and k represents a factor corresponding to a black component of said color filter;

chrominance modulating said second light beam in accordance with modified chrominance component signals; and superimposing said luminance modulated first light beam and said chrominance modulated second light beam onto a projection screen to form a full color image.

21. The projector according to claim 1, wherein a path length of said first light beam is equal to a path length of said second light beam.

* * * * *